United States Patent Office 3,112,341
Patented Nov. 26, 1963

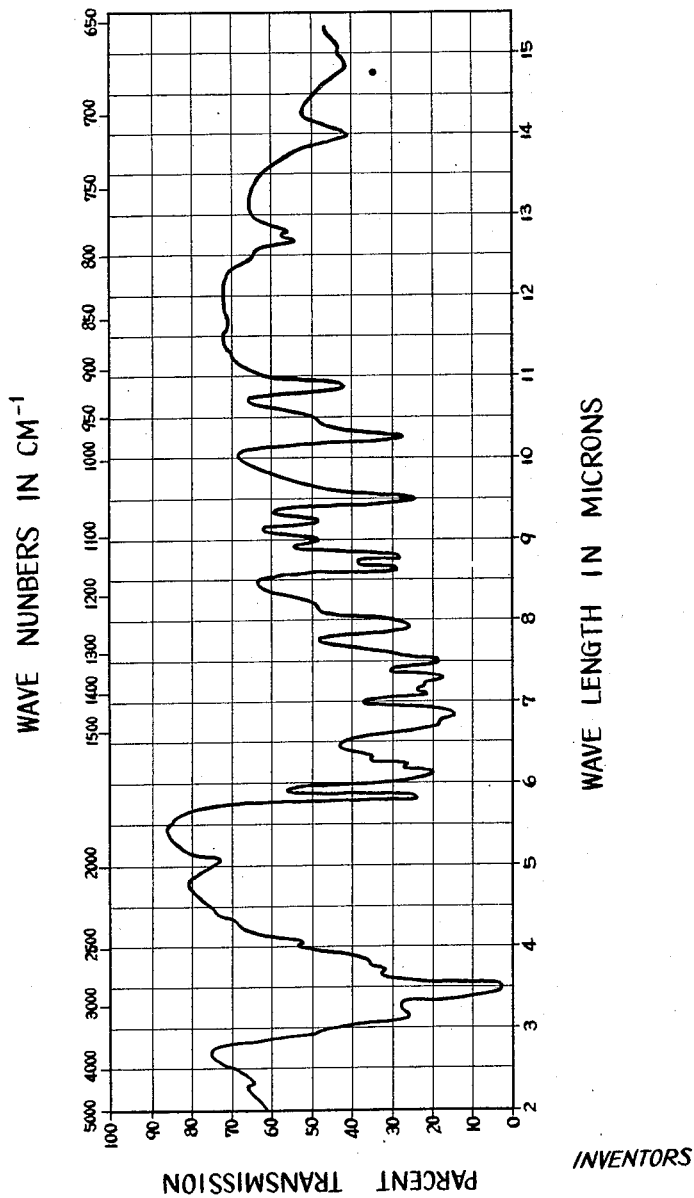

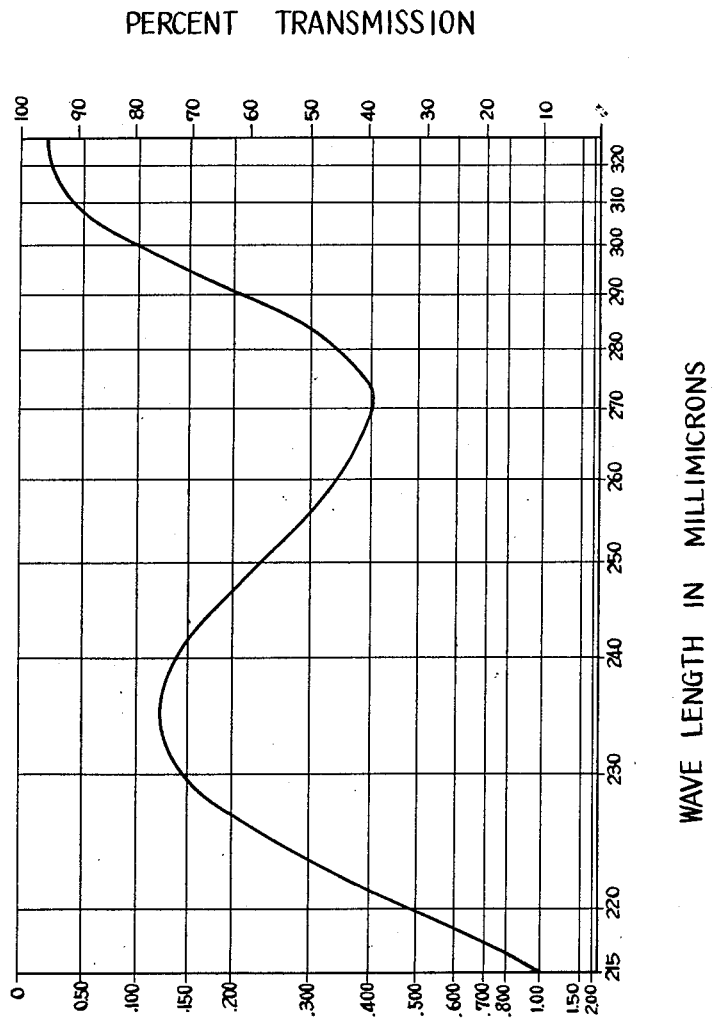

3,112,341
L-δ-HYDROXY-γ-OXONORVALINE
Sueo Tatsuoka and Ken-Ichi Kanazawa, Nishinomiya, Toyoshige Araki, Toyonaka, Koiti Nakazawa, Amagasaki, Akira Miyake, Nishinomiya, Hiromu Hitomi, Ibaraki, Jisaburo Ueyanagi, Nishinomiya, Motoo Shibata, Toyonaka, Fukuhisa Hiraiwa, Yamaguchi, Kanji Tsuchiya, Osaka, Hidesuke Iwasaki and Takeshi Yamaguchi, Toyonaka, Japan, assignors to Takeda Pharmaceutical Industries, Ltd., Higashi-ku, Osaka, Japan
Filed May 13, 1959, Ser. No. 812,838
Claims priority, application Japan May 15, 1958
1 Claim. (Cl. 260—534)

The present invention relates to a new antibiotic—L-δ-hydroxy-γ-oxonorvaline—and to its preparation by fermentation of appropriate microorganisms.

The organisms employed according to the present invention have been isolated from soil in Yamaguchi Prefecture, Japan, and the new antibiotic produced by their cultivation under appropriate culture conditions has been designated "HON." It has been found:

(1) That the microorganisms capable of producing HON belong to a species under the genus Streptomyces;

(2) That HON is accumulated in collectable concentration in a culture of such a microorganism when the microorganism is incubated aerobically;

(3) That the so-accumulated HON can be recovered in desired purity from the incubation broth, by separation thereof from the impurities in the broth, utilizing the physico-chemical properties of the antibiotic; and (4) That HON has an effective antibacterial activity against pathogenic tubercle bacilli.

Broadly state, those strains can be used in the method of the present invention which belong to the genus Streptomyces and are capable of producing HON. Thus, for example, a new strain, designated as Strain H8998, which shows the following microbial characteristics, or a similar strain, or their mutants or variants, may advantageously be employed in the present invention:

(In the following characteristics, the color names used in association with "Rdg." are based on Ridgway's Color Standards and Nomenclature.)

STRAIN H8998

(1) Aerial mycelium: Numerous spiral. Conidia: Oval 1 x 1.2μ.
(2) Czapek agar:
   Growth: Colorless.
   Aerial mycelium: Scant white.
   Soluble pigment: Later becoming faint brown.
(3) Dextrose nitrate agar:
   Growth: Colorless; partly (upper part) Anthracene purple (Rdg. XLIV, 69'''-k).
   Aerial mycelium: White.
   Soluble pigment: Later becoming faint brown.
(4) Glycerin nitrate agar:
   Growth: Colorless. Reverse Pinkish cinnamon (Rdg. XXIX, 15"-b).
   Aerial mycelium: Scant white.
   Soluble pigment: Later becoming faint brown.
(5) Bouillon agar:
   Growth: Colorless.
   Aerial mycelium: White (partly).
   Soluble pigment: Faint brown.
(6) Glucose bouillon agar:
   Growth: Colorless.
   Aerial mycelium: Scant white (1 or 2 colonies).
   Soluble pigment: Faint brown.
(7) Glycerin bouillon agar:
   Growth: Colorless.
   Aerial mycelium: Scant (1 or 2 colonies) white.
(8) Bouillon:
   Surface growth.
   Soluble pigment: Brown.
(9) Glucose bouillon:
   Surface growth.
   Soluble pigment: Brown.
(10) Glycerin bouillon:
   Surface growth.
   Soluble pigment: Brown.
(11) Starch agar:
   Growth: Colorless, Reverse Cream-Buff (Rdg. XXX, 19"-d).
   Aerial mycelium: White.
(12) Yeast extract agar:
   Growth: Colorless. Reverse Orange-Cinnamon (Rdg. XXIX, 13").
   Aerial mycelium: Scant white.
   Soluble pigment: Orange-Cinnamon (Rdg. XXIX, 13").
(13) Potato plug:
   Growth: Colorless, becoming Pale Vinaceous-Drab (Rdg. XLV, 5''''-d).
   Aerial mycelium: Scant white.
   Soluble pigment: Brown.
(14) Carrot plug:
   Growth: Colorless.
   Aerial mycelium: Scant white.
   Soluble pigment: None.
(15) Milk:
   Surface growth, Pinkish Buff (Rdg. XXIX, 17"-d), no change.
(16) Starch hydrolysis: Starch hydrolysis.
(17) Calcium malate agar:
   Growth: Colorless.
   Aerial mycelium: Scant white.
(18) Tyrosinate agar:
   Growth: Colorless.
   Aerial mycelium: None.
(19) Egg media:
   Growth: Sooty Black (Rdg. LI, 1'''''-m).
   Aerial mycelium: None.
(20) Gelatin stab:
   Growth: Colorless.
   Aerial mycelium: White.
   Soluble pigment: Brown.
   No liquefaction or very slowly liquefied.
(21) Nitrate reduction: Nitrate reduction.
(22) No growth on cellulose.
(23) Carbon utilization:

| | | | |
|---|---|---|---|
| Control | − | Raffinose | +++ |
| D-xylose | ++ | Inulin | +++ |
| L-arabinose | +++ | D-mannitol | +++ |
| L-rhamnose | +++ | D-sorbitol | +++ |
| D-fructose | +++ | Dulsitol | − |
| D-galactose | +++ | DL-inositol | +++ |
| Sucrose | +++ | Salicin | ± |
| Maltose | +++ | Na-acetate | + |
| Lactose | +++ | Na-citrate | + |

On the basis of its microbial properties, the microorganism (Strain H8998) is a strain of a new species, which species has been named *Streptomyces akiyoshiensis* Nov. sp., so that the name of the microorganism is *Streptomyces akiyoshiensis* Nov. sp. (Strain H8998). This strain produces no or only scanty soluble pigment; there are strains of *Streptomyces akiyoshiensis*, however, which are capable of producing pale brown or brown pigment on various culture media described above. For example, Strain H43464 has the following itemized microbiological properties, in view of which the strain is classified, from the taxonomical viewpoint, as a variant of *Streptomyces akiyoshiensis*:

STRAIN H43464

(1) Czapek agar:
   Growth: Colorless. Reverse becoming Indian purple (Rdg. XLIV, 69'''–i) to Taupe Brown (Rdg. XLIV, 69'''–m).
   Aerial mycelium: White, later becoming Pale Brownish Vinaceous (Rdg. XXXIX, 5'''–d).
   Soluble pigment: Faint brown.

(2) Glucose czapek agar:
   Growth: Colorless. Reverse Dark state purple (Rdg. XLIV, 65'''–k) to Taupe Brown (Rdg. XLIV, 69'''–m).
   Aerial mycelium: White, later becoming Pale Vinaceous lilac (Rdg. XLIV, 69''''–f) to Light Vinaceous-Lilac (Rdg. XLIV, 69''''–d).
   Soluble pigment: Faint Brown.

(3) Glycerin czapek agar:
   Growth: Colorless. Reverse becoming Dull Indian purple (Rdg. XLIV, 69'''–i).
   Aerial mycelium: White. Reverse becoming Pale Vinaceous lilac (Rdg. XLIV, 69'''–d).
   Soluble pigment: Faint Brown.

(4) Glucose asparagine agar:
   Growth: White. Reverse becoming Light Vinaceous lilac (Rdg. XLIV, 69'''–d) to Light Russet-Vinaceous (Rdg. XXXIX, 9'''–b).
   Aerial mycelium: White to Pale Brownish Vinaceous (Rdg. XXXIX, 5'''–f).
   Rhodonite pink (Rdg. XXXVIII, 71''''–d) like pigment beneath the growth.

(5) Bouillon agar:
   Growth: Colorless.
   Aerial mycelium: White to Pale Brownish Vinaceous (Rdg. XXXIX, 5'''–f).
   Soluble pigment: Brown.

(6) Glucose bouillon agar:
   Growth: Colorless, later becoming Brownish Vinaceous (Rdg. XXXIX, 5'''–b) to Dark Vinaceous Brown (Rdg. XXXIX, 5'''–k).
   Aerial mycelium: Partly white.
   Soluble pigment: Brown.

(7) Glycerin bouillon agar:
   Growth: Colorless, later becoming Deep Hellebone Red (Rdg. XXXVIII, 71'') to Black.
   Aerial mycelium: Partly white.
   Soluble pigment: Brown.

(8) Bouillon:
   Surface growth.
   Soluble pigment: Brown.

(9) Glucose bouillon:
   Ring growth.
   Soluble pigment: Brown.

(10) Glycerin bouillon:
   Ring growth.
   Soluble pigment: Brown.

(11) Starch bouillon:
   Growth: Colorless. Reverse later becoming Deep Hyssopviolet (Rdg. XXXVI, 59''–i) to Dusky Dullviolet (2) (Rdg. XXXVI, 59''–m).
   Aerial mycelium: White to Pale Smoke gray (Rdg. XLVI, 21''''–f).
   Soluble pigment: Faint Lavender (Rdg. XXXVI, 59''–f).

(12) Yeast extract agar:
   Growth: Colorless. Reverse Cinnamon (Rdg. XXIX, 15'') to Orange Cinnamon (Rdg. XXIX, 13'').
   Aerial mycelium: White.
   Soluble pigment: Orange Cinnamon (Rdg. XXIX, 13'').

(13) Potato plug:
   Growth: Colorless, becoming Pale Vinaceous Drab (Rdg. XLV, 5'''–d).
   Aerial mycelium: Scant white.
   Soluble pigment: Brown.

(14) Carrot plug: No growth.

(15) Milk:
   Ring growth.
   Peptonization: None.

(16) Gelatin:
   Slowly liquefied.
   Aerial mycelium: White.
   Soluble pigment: Faint Brown.

(16) Czapek solution: Scant growth at the bottom.

(17) Cellulose: Scant growth.

(18) Starch hydrolysate: Hydrolyzed.

(19) Calcium malate agar:
   Growth: Colorless. Reverse Brownish Vinaceous (Rdg. XXXIX, 5'''–b) to Vinaceous Drab (Rdg. XLV, 5'''').
   Aerial mycelium: White.

(20) Tyrosinate agar:
   Colorless, becoming Avellaneous (Rdg. XL, 17'''–b).
   Aerial mycelium: None.

(21) Carbon utilization:

| | | | |
|---|---|---|---|
| Control | + | Raffinose | +++ |
| D-xylose | ++ | Inulin | +++ |
| L-arabinose | +++ | D-sorbitol | +++ |
| L-rhamnose | +++ | D-mannitol | +++ |
| D-fructose | +++ | Dulsitol | + |
| D-galactose | +++ | DL-inositol | +++ |
| Sucrose | +++ | Salicin | ÷ |
| Maltose | +++ | Na-acetate | ++ |
| Lactose | +++ | Na-citrate | +++ |

It will be understood that the production of HON by the present invention is not restricted to organisms answering the precise descriptions set forth, solely by way of example, in the foregoing descriptions. Such production also embraces variants, as well as mutants produced for example by natural or artificial means such as irradiation by X-ray or ultraviolet rays or by the action of a chemical reagent, etc.

Strains useful for the production of HON according to this invention appear to have, as closest resembling relatives, *Streptomyces erythrochromogenes;* however *S. akiyoshiensis* can be distinguished from *S. erythrochromogenes* in the following itemized properties. Thus, the desired strain can be selectively obtained by a dilution culture method or the like, utilizing the following differences:

| | *Streptomyces akiyoshiensis* (H8998) | *Streptomyces erythrochromogenes* |
|---|---|---|
| Glucose agar | Red pigment formed | Red pigment around or near the colony. |
| Starch agar | A soluble rose pigment on old culture. | No soluble pigment. |
| Nitrate reduction | Slight reduction | Strong reduction. |

As aforeindicated, the primary objects of the present invention are to embody a new antibiotic HON and also to provide a method for the production of the latter. Such method is characterized in that a strain of HON-producing species such as *Streptomyces akiyoshiensis* is incubated in an aqueous nutrient-containing medium under aerobic conditions to accumulate HON in the medium, and so-produced HON is recovered utilizing its physico-chemical properties.

For incubating of HON-producing strain, use is made of an aqueous nutrient-containing medium containing assimilable carbon sources, digestive nitrogen sources, inorganic salts, growth accelerators, etc. As the carbon source, starch, lactose, sucrose, dextrin, glycerin, maltose, etc. may be employed. As the nitrogen source, soybean protein, meat extract, peptone, peanut powder, casein, amino acids, yeast, bran, cornsteep liquor, cotton seed powder, nitrates, urea, ammonium compounds, etc. may be employed. Further, a small quantity of the usual inorganic salts and/or growth accelerators are added to the medium. And, if desired, other conventional nutrient factors or precursors may be added.

The incubation medium may be solid or liquid, but liquid medium is rather suitable for an industrial purpose, and the submerged culture is the most preferable. When *Streptomyces akiyoshiensis* is used as the HON-producing microorganism and the incubation is conducted under aerobic submerged conditions, the incubation is preferably conducted at a temperature of about 23° to 30° C. over a period of 2 to 5 days, and the medium may be adjusted at pH 6–8, but these conditions, of course, may be selected in accordance with the other conditions or with the specific microorganism used. Most preferably, the pH may be around neutral, temperature may be about 28° C., and the incubation period may be 2 to 5 days. Under aerobic conditions, the incubation is most preferably conducted for 3 to 4 days. The incubation conditions, however, are not definitive ones, and they should be selected or adjusted so as to secure the most preferable results taking the mutual relationship into consideration.

HON thus accumulated in the incubation medium can be recovered in an optional purity—including crystalline state—being separated from impurities by means of various physical or chemical methods, utilizing the properties of HON. HON is a white crystalline substance, soluble in water, generally insoluble in various organic solvents. HON can not be extracted from its aqueous solution into an organic solvent layer at a pH between 2 and 9. Though HON is hardly adsorbed on an active charcoal from its aqueous solution, it can easily be adsorbed into a strongly acidic or a strongly basic ion exchanger. Though HON adsorbed on a strongly basic ion-exchanger is hardly eluted, that on a strongly acidic ion exchanger is easily eluted.

Steps for recovering HON from an incubation broth by means of these physico-chemical properties may be exemplified as in the following:

The greater part of HON is comprised in the filtered broth, when HON is produced by incubation of HON-producing microorganisms such as *Streptomyces akiyoshiensis*. HON is, therefore, preferably recovered from a filtered broth obtained by removing mycelia. HON is easily adsorbed on a strongly acidic ion-exchanger, and is more easily absorbed if it is placed in a weakly acidic solution. Therefore, the incubation broth may be made weakly acidic before the adsorption treatment. For the purpose, mineral acids such as hydrochloric acid, sulfuric acid and phosphoric acid or organic acids such as oxalic acid may be added to the broth for adjusting the pH to weakly acid. When HON is adsorbed on an ion-exchanger, the adsorption is obstructed if calcium ions ($Ca^{++}$) are present in the material. Thus, a treatment for removing $Ca^{++}$-ions may advantageously be conducted beforehand. $Ca^{++}$-ions are removed most preferably by means of sulfuric acid, phosphoric acid, oxalic acid, etc. simultaneously with the adjustment of pH of the broth. As HON can hardly be adsorbed on an activated charcoal, decolorization by charcoal may be conducted beforehand.

HON in the broth treated as the above is, in the next step, adsorbed on a strongly acid ion-exchanger. As the strongly acid ion-exchanger, there may generally be used ion-exchange resins belonging to styrene-series or phenol-series resins of the sulfonic acid type. Resins now on market which correspond to those used in this invention are "Amberlite IR-112", "Amberlite IR-120" (Rohm & Haas, Co., U.S.A.), "Dowex 50-X" (Dow Chemical, Co., U.S.A.) and "Diaion SK No. 1" (Mitsubishi Chemical Industries, Ltd., Japan), for instance, and any of these may be employed advantageously. For HON to be adsorbed on such ion-exchanger, the incubation broth is allowed to flow through a tower or a layer of the ion-exchanger, or is stirred together with the ion-exchanger, for instance. The former process is rather preferable.

HON thus adsorbed on a strongly acid ion-exchanger is eluted in the next step. For the solvent for elution, a weakly basic aqueous solution such as an aqueous ammonia may be employed. For this purpose, 0.1 to 1 normal aqueous ammonia is preferably employed. Initial eluate is weakly acidic (pH 4–5), but it hardly contains active components. Further elution is continued to obtain an eluate having pH 3.5–4 which contains considerable concentration of the active components; further elution gives elevation of the pH up to 11 and in this fraction active components are contained in a higher concentration.

It is sometimes possible to omit some of the above-mentioned steps. In the succeeding steps, the eluate containing active components is adjusted to weakly acid by means of mineral acid such as hydrochloric acid and sulfuric acid or of an ion-exchange resin of the carboxylic acid series such as "Amberlite IRC-50" (Rohm and Haas Co., U.S.A.). The aqueous solution thus obtained is generally pale yellow to dark black, and may be decolorized by means of active charcoal. Or, the impurities may be removed by extraction with an organic solvent immiscible with water. For this purpose, such solvents as n-butanol, methyl isopropyl ketone may conveniently be employed. The aqueous solution from which impurities are removed is ordinarily pale yellow to brownish. For recovering active components from the aqueous solution, it is preferable that the solution is concentrated beforehand. The concentration may conveniently be carried out under reduced pressure, and if an organic solvent such as n-butanol and benzene is co-present, concentration is preferably effected.

For recovering HON from the aqueous solution containing HON, an organic solvent freely miscible with water may be added to the solution, utilizing the low solubility of HON in an organic solvent. The volume of the organic solvent for this purpose may be equal to thrice the volume of the aqueous solution. As the organic solvent there may be employed lower fatty alcohols such as methanol, ethanol, propanol and isopropanol, or lower fatty ketones such as acetone.

The active component thus separated from the aqueous solution comprising HON is in the form of crude crystals containing more or less impurities. The crude crystals of HON may be further purified, if desired. The further purification may conveniently be effected by repeating the treatment in which an organic solvent is added to an aqueous solution of crude crystals. For this purpose, such organic solvents as described above may also be employed. The volume of the solvent may conveniently be selected between equal the volume and twice the volume of the aqueous solution. Or, instead of the above-mentioned re-precipitation method, a hot solution of the crude crystals in e.g. an aqueous lower fatty alcohol may be allowed to cool to separate purified crystals. For this purpose, the concentration of the aqueous alcohol may preferably be about 50%. Of course, both the re-precipitation and the recrystallization may conveniently be used jointly, or decolorization by means of active charcoal may conveniently be inserted in those steps.

Fully purified HON is in the form of white needle-like crystals, and shows no definite melting point although it blackens at about 80° C. Analysis gives results coresponding to the empirical formula $C_5H_9O_4$.

Physicochemical properties of HON are as follows:

(1) Specific rotation: $[\alpha]_D^{17} = -8.2°$ (c. 3.4%, $H_2O$)
(2) Rf-value of paper partition chromatogram (ascending method; developed with n-butanol.acetic acid.water (4:2:1)) is 0.22.
(3) HON reduces both ammoniacal silver nitrate and Fehling's solution, and red color is observed when HON is heated together with a dilute sodium hydroxide solution.
(4) HON is an amphoteric substance, and therefore forms salts with acids or bases.
(5) pK'a=2, 9.1
(6) HON is easily soluble in water, and almost insoluble in other solvents.
(7) Infrared absorption of HON in a liquid paraffin suspension observed by sodium chloride prism is shown in FIG. 1, and the absorption bands thereof are listed in the following: 3.13, 3.7, 3.8, 4.05, 5.05, 5.83, 6.12, 6.25, 6.7, 7.12, 7.5, 7.95, 8.65, 8.8, 9.0, 9.25, 9.55, 10.3, 10.9, 12.7, 12.8 and 14.0μ.
(8) Ultraviolet absorption of HON in an aqueous solution is shown in FIG. 2, and the absorption maximum is observed to be 271 mμ ($\epsilon$=24).
(9) HON is considerably stable under weakly acidic conditions, and the antibiotic activity is not lowered even when HON is heated for 15 minutes at 100° C. at pH 3.0. On the other hand HON is relatively unstable under basic conditions, and is almost decomposed to show red if it is heated for 15 minutes at 100° C. at pH 8.6.

As aforestated, HON shows strong antibiotic activity against pathogenic tubercle bacilli, but it shows no or slight activity against the other microorganisms. That is, the growth of human type tubercle bacilli (*Mycobacterium tuberculosis*), $H_{37}Rv$ strain, isonicotinoyl hydrazine-resistant $H_{37}$ Rv strain or streptomycin-resistant $H_{37}Rv$ strain is completely inhibited by a concentration of 10γ/ml. when the antimicrobial activity is observed using Kirchner's medium for 2 weeks. And, the growth of bovine type tubercle bacilli (*Mycobacterium bovis*) Ravenel strain, isonicotinoyl hydrazine resistant Ravenel strain or Carmette-Gueran's strain (B.C.G.) is completely inhibited by a concentration of 20γ/ml. On the other hand, the growth of Avian tubercle bacilli (*Mycobacterium avium*), *Mycobacterium phlei*, *Mycobacterium timothy*, *Mycobacterium smegmatis*, *Mycobacterium* 607, *Mycobacterium* 720 or *Mycobacterium hirodai* No. 5 can not be inhibited by a concentration of 400γ/ml. The growth of Gram-positive or -negative bacteria, fungi or yeasts was not inhibited even at a concentration of HON of 400γ/ml. HON shows strong antimicrobial activity, even in a living body, against pathogenic tubercle bacilli, and is especially useful against strains which are resistant to previously-used agents.

As to the structure of HON: (1) when HON is reduced catalytically using platinum oxide and palladium carbon, it absorbs one mole of hydrogen to form dihydroxy compound, and (2) when HON is oxidized with periodic acid, it decomposes into both aspartic acid and formaldehyde. The chemical structure of HON is thus

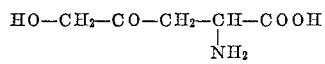

As is evident from this formula, HON has one asymmetric center. As produced by the incubation of e.g. *Streptomyces akiyoshiensis*, HON is an optically active compound, and the specific rotations in its neutral, acid and basic solutions are as follows:

$[\alpha]_D^{17}$ —8.2 (c., 3.4%, $H_2O$)
$[\alpha]_D^{20}$ +4.0 (c., 3.0%, 0.1 N HCl)
$[\alpha]_D^{20}$ +4.0 (c., 3.0%, 0.1 N NaOH)

The fermentation produced HON has L-configuration. (Lutz's law.) Thus, HON is L-δ-hydroxy-γ-oxonorvaline. HON is an α-amino acid, but there is no such amino acid among the hitherto-known amino acids, and there are no known amino acids having singular antibacterial activity against pathogenic tubercle bacilli.

The following examples are illustrative of the invention:

EXAMPLE 1

(1) Seed Incubation

*Streptomyces akiyoshiensis* (H8998 strain) incubated on a glucose asparaginate agar is inoculated in the undermentioned medium for 3 days at 28° C. with stirring using L-shaped seed incubation apparatus:

| | |
|---|---|
| Glucose _____weight percent__ | 1.0 |
| Peptone _____do____ | 0.5 |
| Bonito extract_____do____ | 0.5 |
| Sodium chloride_____do____ | 0.3 |
| Starch _____do____ | 0.5 |
| pH _____ | 7.0–7.2 |

Further, the culture is incubated for 2 days in a 300 milliliter-long-necked flask, and for 3 additional days at 28° C. in 2 l.-flask, under stirring.

(2) Incubation

INCUBATION MEDIUM

| | |
|---|---|
| Soybean powder (fine powder of fresh soybean)_____weight percent__ | 2 |
| Glucose _____do____ | 2.5 |
| Precipitated calcium carbonate_____do____ | 0.5 |
| Sodium chloride_____do____ | 0.25 |
| Tap water | |
| pH _____ | 7.0 |

The seed culture obtained in (1) is inoculated on the above medium in a 50 liter-stainless steel tank, then the incubation is conducted for 4 days at 28° C. under the condition of aeration ratio 50%, inner pressure 10 lbs. and agitation 320 r.p.m., adding lard as an antifoaming agent. The culture becomes dark brown.

(3) Recovery

To 25 liters of the incubation broth are added 2.5 liters of saturated aqueous solution of oxalic acid and 250 grams of active charcoal. After stirring for 1 hour, the broth is filtered to obtain a pale yellow filtered broth showing pH 3.5. The filtered broth is allowed to flow through a tower packed with 2 liters of "Amberlite IR-120 (free type)" at a velocity of 1 liter per hour to adsorb the active component completely. After washing with water, the active component is eluated out with 0.3 normal unit aqueous ammonia at a velocity of 15 to 20 milliliters per minute. The initial 2 liters of the eluate contain no active component. The elution is further continued, then the pH of the eluate is lowered to about 3.5, then elevated again to about 11.0, the whole volume of the eluates containing HON is about 2 liters. The combined eluate is adjusted to pH 3.5 with hydrochloric acid, and 500 milliliters of n-butanol is added thereto. The mixture is concentrated under reduced pressure to about 200 milliliters. To the concentrate is added 2 grams of active charcoal and filtered, then 500 milliliters of acetone is added to separate pale brown needle-like crystals. To an aqueous solution of the latter, twice its volume of acetone is added, then the mixture is allowed to stand in a refrigerator to obtain while needles. Further, this treatment is repeated several times to obtain 10 grams of purified product (HON).

Cultures of *Streptomyces akiyoshiensis* (H8998 strain) have been filed with Institute for Fermentation, Osaka, Japan, accession number IFO 3810, and with the American Type Culture Collection, Washington, D. C., accession number ATCC 13479.

EXAMPLE 2

*Streptomyces akiyoshiensis* (H43464 strain) is incubated at 28° C. for 4 days in a tank under conditions described in Example 1. A saturated aqueous solution of oxalic acid and active charcoal are added to the incubation broth and the mixture is stirred for 1 hour and filtered. The filtered broth is allowed to flow through a tower packed with "Amberlite IR-120 (free type)" to absorb the active component. After washing with water, the active component is eluted from the tower by means of 0.3 normal unit aqueous ammonia at a ratio of 15 to 20 milliliters per minute. The eluate is adjusted to pH 7.5–8.0 with "Amberlite IR-45," then further adjusted to pH 3.5–4.0 with "Amberlite IRC-50." The same treatments as above with two resins are repeated thrice. To the eluate showing pH 3.5–4.0 thus obtained is added n-butanol, then the mixture is concentrated under reduced pressure to about one tenth of it volume. Decolorization of the concentrate is conducted using active charcoal, and a large quantity of acetone is added to obtain crude crystals of the active component. To an aqueous solution of the crude product is added twice its volume of acetone, then the mixture is allowed to stand in a refrigerator to obtain white crystals (HON).

Cultures of *Streptomyces akiyoshiensis* (H43464 strain) have been filed with Institute for Fermentation, Osaka, Japan, accession number IFO 3811, and with the American Type Culture Collection, Washington, D.C., accession number ATCC-13480.

EXAMPLE 3

Fifteen liters of a filtered broth of a culture of *Streptomyces akiyoshiensis* (H8998 strain) obtained by treatment according to Example 1 is allowed to flow through a tower packed with 2 liters of Amberlite IRC-50" (H type), then the eluate is concentrated under reduced pressure to about 1 liter. After decoloration, 1 liter of methanol is added to the concentrate to separate amorphous precipitates. To the filtrate is added 2 liters of acetone to obtain a resinous substance. Repetition of recrystallization of the product from water-acetone gives 3 grams of purified product (HON).

The molecular weight by titration method of HON produced by the present invention was observed as 144–150.

In the previously recited culture characteristics of HON-producing microorganisms, the carbon utilizations were observed by so-called Pridham's method, and the meanings of symbols used are as follows:

− no growth, ± growth doubtful, + poor growth, ++ fair growth, +++ good growth.

Having thus disclosed the invention, what is claimed is:
L-$\delta$-hydroxy-$\gamma$-oxonorvaline.

References Cited in the file of this patent
UNITED STATES PATENTS

| | | |
|---|---|---|
| 2,773,093 | Opfemann | Dec. 4, 1956 |
| 2,776,243 | McGhee et al. | Jan. 1, 1957 |
| 2,779,786 | Coleman | Jan. 29, 1957 |
| 2,787,580 | Flushing | Apr. 2, 1957 |